United States Patent [19]
Sekimoto et al.

[11] Patent Number: 5,446,721
[45] Date of Patent: Aug. 29, 1995

[54] OBJECTIVE LENS DRIVE DEVICE WITH SUPPORT SYSTEM

[75] Inventors: Yoshihiro Sekimoto, Nara; Toshiharu Inui, Yamatokouriyama; Yasuo Nakata, Nara; Nobuo Ogata, Tenri; Hideaki Sato, Yamatokouriyama, all of Japan

[73] Assignee: Sharp Kabushiki Kaisha, Osaka, Japan

[21] Appl. No.: 138,014

[22] Filed: Oct. 19, 1993

[30] Foreign Application Priority Data

Oct. 22, 1992 [JP] Japan .................... 4-284106

[51] Int. Cl.⁶ .................... G02B 7/02; G11B 7/00
[52] U.S. Cl. .................... 369/247; 369/44.15; 359/813
[58] Field of Search .................... 369/247, 44.15, 44.16; 359/811, 813, 814, 815, 824

[56] References Cited

U.S. PATENT DOCUMENTS

| | | | |
|---|---|---|---|
| 4,568,142 | 2/1986 | Iguma | 369/44.16 |
| 4,927,235 | 5/1990 | Narumi | 369/44.15 |
| 5,018,836 | 5/1991 | Noda et al. | 350/247 |
| 5,208,703 | 5/1993 | Ikegame et al. | 359/813 |

FOREIGN PATENT DOCUMENTS 3804075 9/1988 Germany .
63-195834 8/1988 Japan .

OTHER PUBLICATIONS

Patents Abstracts of Japan vol. 15, No. 237 (P-1216) 19 Jun. 1991, (JP-A-30 73 426 Mar. 28, 1991).
Patent Abstracts of Japan vol. 11, No. 219 (P-596) 16 Jul. 1987 (JP-A-62 036 741 Feb. 17, 1987).
Patent Abstracts of Japane vol. 9, No. 312 (P-411) 7 Dec. 1985 (JP-A-60 140 547 Jul. 25, 1985).

*Primary Examiner*—Stuart S. Levy
*Assistant Examiner*—William R. Korzuch

[57] ABSTRACT

In an objective lens driving apparatus used in an optical information recording and reproducing apparatus or the like, a vibration is suppressed and a resonance peak on transfer function is suppressed when movable portions are moved in focusing and tracking directions and when these portions are turned around focusing and tracking directions. An elastic body which supports the movable portions movably in two directions, i.e., focusing direction and tracking direction to a fixed portion includes a bent portion in an intermediate portion between the side of movable portion and the side of fixed portion. A damper member is adhered to bridge a gap between a branched arm portion branching from a linear portion extending from the side of movable portion, and a fixed portion. The bent portion couples two linear portions and which are not on the same line.

2 Claims, 8 Drawing Sheets

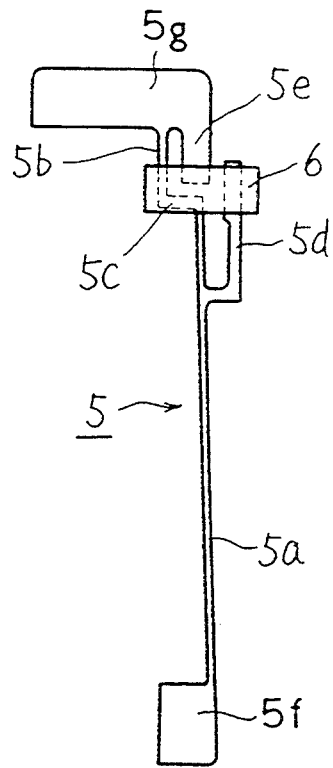
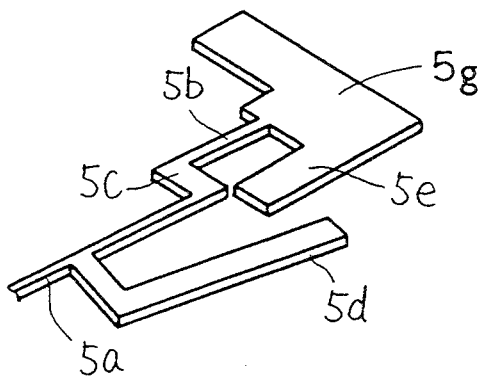
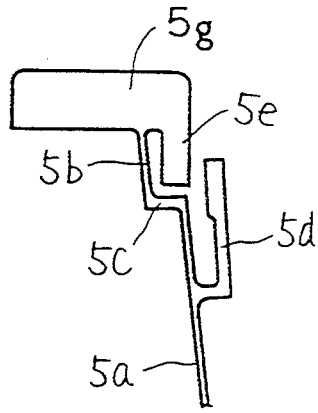
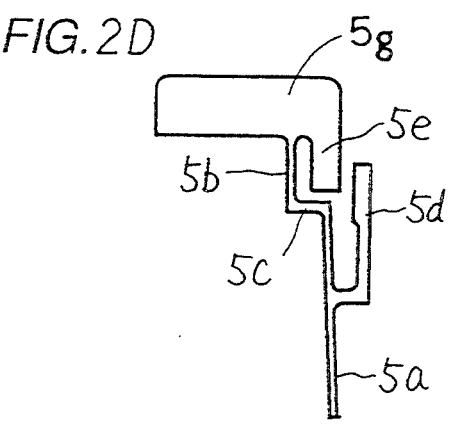

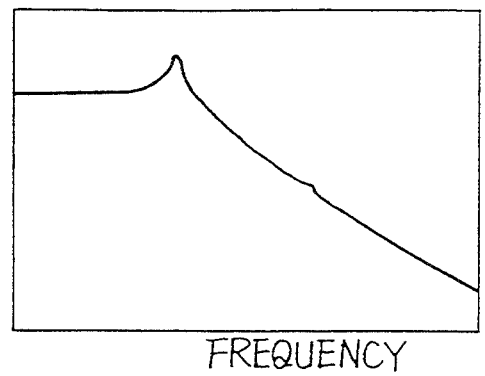
FIG. 3A Gain / FREQUENCY
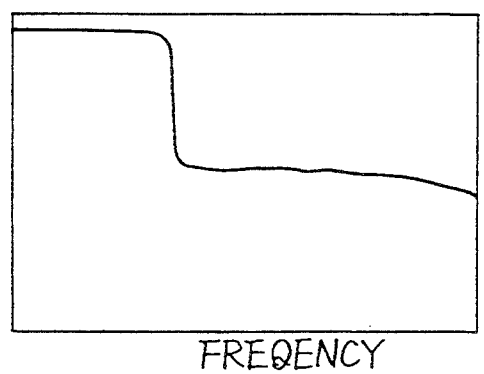
FIG. 3B Phase / FREQENCY
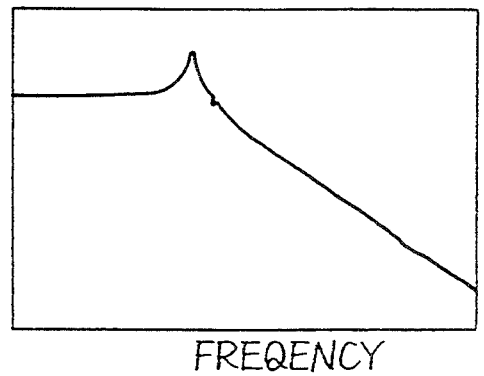
FIG. 3C Gain / FREQENCY
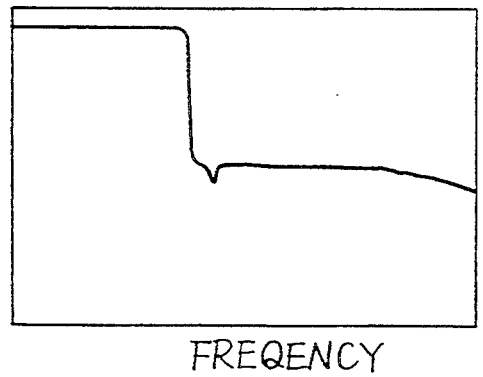
FIG. 3D Phase / FREQENCY Gain

FREQUENCY

Phase

FREQUENCY

Gain

FREQUENCY

Phase

FREQUENCY

OBJECTIVE LENS DRIVE DEVICE WITH SUPPORT SYSTEM

BACKGROUND OF THE INVENTION

1. Field of the Invention

The present invention relates to improvements in an objective lens driving apparatus provided for an optical information recording and reproducing apparatus or the like which can record, reproduce, or erase information optically by irradiating a recording medium with a light beam.

2. Description of the Background Art

An objective lens driving apparatus which drives an objective lens biaxially to control a position of condensed light of a light beam which irradiates information of a recording medium such as magneto-optical disk or the like through an objective lens in focusing and tracking directions is known.

FIG. 4 is a perspective view of an example of such objective lens driving apparatus.

A lens holder 53 which holds an objective lens 52 is provided for an objective lens driving apparatus 51. At both sides of lens holder 53, elastic bodies 55, 55, . . . which support lens holder 53 movable in two directions against a fixed portion 54 are attached at upper and lower positions, and damper members 56, 56, . . . are adhered to the joint portion in the vicinity of fixed portion 54. Elastic body 55 has a portion fixed to fixed portion 54 and a portion fixed to lens holder 53, which are formed of one linear elastic member. Damper member 56 is affixed in the vicinity of a joint between elastic body 55 and fixed portion 54.

A focusing coil 57 and a tracking coil 58 are adhered to the center hole of lens holder 53. Parts of focusing coil 57 and tracking coil 58 are located in a magnetic gap 59a in a magnetic circuit 59 extended from fixed portion 54, and the magnetic circuit includes permanent magnets 60a, 60b and yoke portions 61a, 61b. Focusing coil 57 is coiled to enclose one of the permanent magnets 60a and yoke 61a, and a portion unnecessary to generate driving force is positioned outside magnetic gap 59a.

In the conventional structure mentioned above, vibrations of movable portion in the focusing and tracking directions are suppressed to some extent by damper members 56.

FIG. 5 is a plan view of a conventional object lens driving apparatus showing a turn of the movable portion around an axis in the focusing direction, and FIG. 6 is a side view of the conventional objective lens driving apparatus showing a turn of the movable portion around an axis in the tracking direction. However, vibrations of elastic body 55 in expanding and contracting directions along the length or a torsional vibration of elastic body 55, which are generated when a turning force around the axis in the focusing direction as represented by an arrow A in FIG. 5 and turning force around the axis in the tracking direction as represented by an arrow B in FIG. 6 are exerted, are hardly suppressed. Therefore, as shown in FIGS. 7A, 7B, 7C and 7D, high resonance peaks 62a, 62b, 62c and 62d remain in transfer function. FIGS. 7A and 7B are graphs showing gain-to-frequency and phase-to-frequency transfer functions in the focusing direction, and FIGS. 7C and 7D are graphs showing gain-to-frequency and phase-to-frequency transfer function in the tracking direction.

A structure of a supporting member to suppress the vibrations mentioned above is disclosed in Japanese Patent Laying-Open No. 63-195834. However, in the structure, a flexible portion (elastic body) curved in the form of arc is used. Therefore, it is necessary to process the elastic body to a complicated shape and manufacture of this shape thereof is difficult. Additionally, since the elastic body has a complicated shape, it is disadvantageous in miniaturizing the apparatus according to a miniaturized, light weighted movable portion.

Furthermore, since the flexible portion is in a small form of a circular arc, it is difficult to obtain a suitable primary resonance frequency for the miniaturized, light weighted movable portion.

SUMMARY OF THE INVENTION

One object of the invention is to provide an objective lens driving apparatus provided with an elastic body having a simpler shape, which can suppress expanding and contracting vibrations of the elastic body along the longitudinal direction or a torsional vibration of the elastic body, whereby a resonance peak can be made lower.

The objective lens driving apparatus in accordance with the invention includes a fixed portion, a movable portion, a supporting member and a driving member. The movable portion includes a condenser member for condensing a light beam to irradiate a recording medium therewith and a holding member for holding the condenser member. The supporting member supports the movable portion against the fixed portion, so that the condenser member can be moved at least in focusing and tracking directions to the recording medium. The driving member moves the movable portion in focusing and tracking directions. The supporting member includes an elastic body and a damping body. The elastic body connects the fixed portion and the movable portion. The damping body is provided for the elastic body. The elastic body includes first and second end portions and a connecting portion. The first end portion is attached to the movable portion. The second end portion is attached to the fixed portion. The connecting portion connects the first and second end portions. The connecting portion includes a first linear portion, a second linear portion extending along a different line from the first linear portion, a coupling portion extended in a direction crossing the first and second linear portions to couple these portions, and a branch portion branching from the first linear portion and extending near the coupling portion. The damping body is adhered to bridge a gap between either of the first and second linear portions and the branch portion.

By utilizing the present invention, functions of the coupling portion and the damping body provided for the elastic body suppress not only vibrations in the focusing and tracking directions but also expanding and contracting vibrations of the elastic body along the longitudinal direction and torsional vibrations of the elastic body, so that a resonance peak can be suppressed.

Additionally, since the entire linear portion is flexible, which ensures a long valid length thereof, a suitable primary resonance frequency can be obtained even in a miniaturized light weighted movable portion.

Effects of the coupling portion and the damping body suppress the vibration not only of a primary resonance in the focusing and tracking directions, but also the vibration of a resonance in turning mode seen in a high range, which can lower the resonance peak on transfer function, resulting in stabilized operation of the objective lens.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 2A to 2D are diagrams showing the shape and the deformed state of the elastic body used in the invention, while

FIGS. 3A to 3D are graphs showing transfer function in focusing and tracking directions, respectively.

DESCRIPTION OF THE PREFERRED EMBODIMENTS

Figure 1:
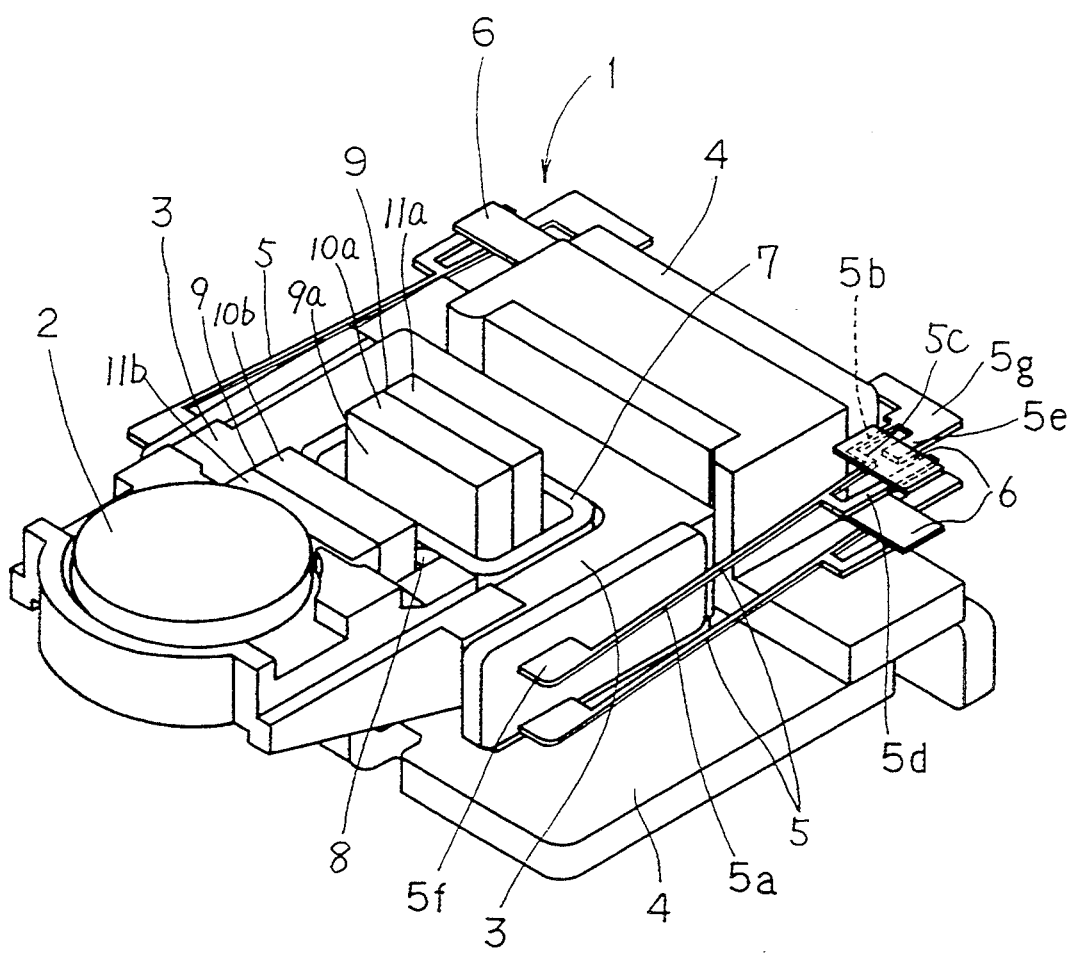
FIG. 1 is a perspective view showing one embodiment of an object lens driving apparatus of the invention.
Figure 4:
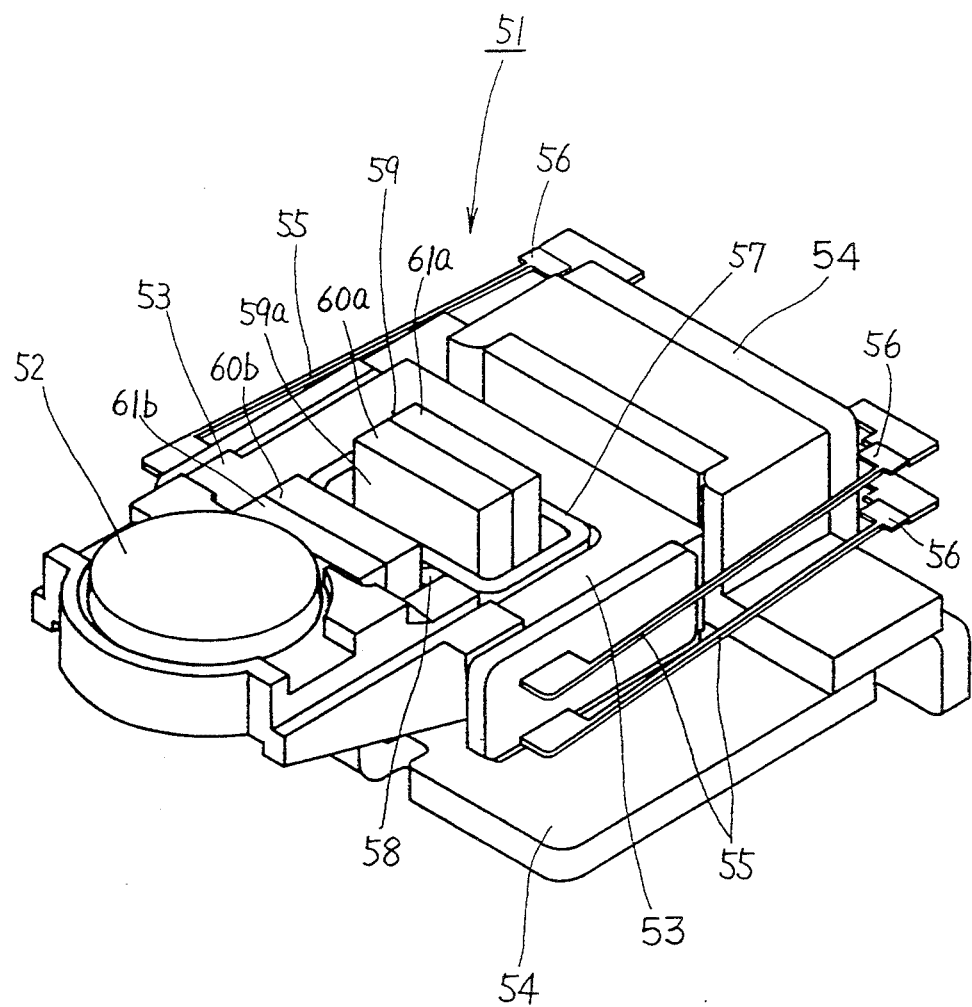
FIG. 4 is a perspective view showing a conventional objective lens driving apparatus.
Figure 5:
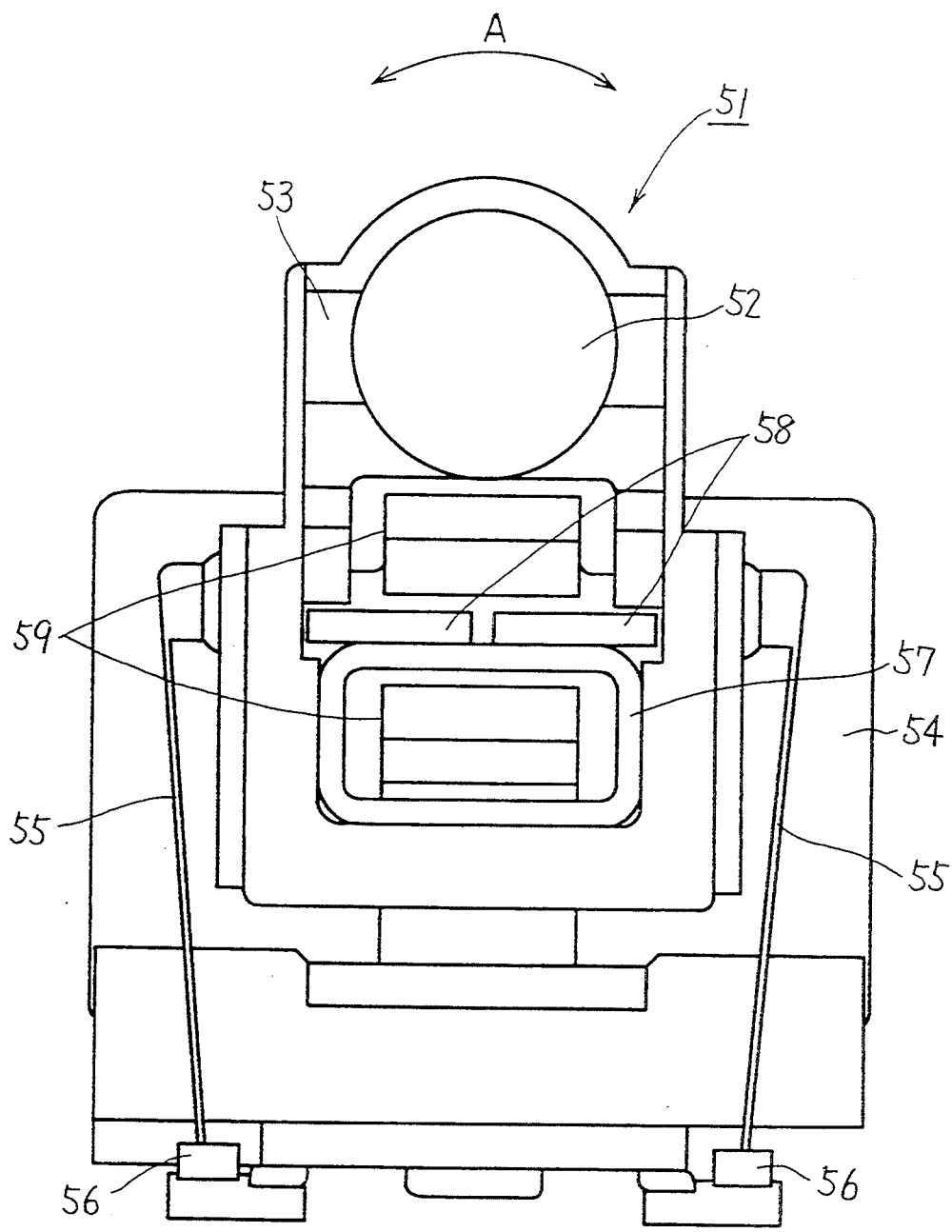
FIG. 5 is a plan view of an objective lens driving apparatus showing a turn around an axis of the focusing direction.
Figure 6:
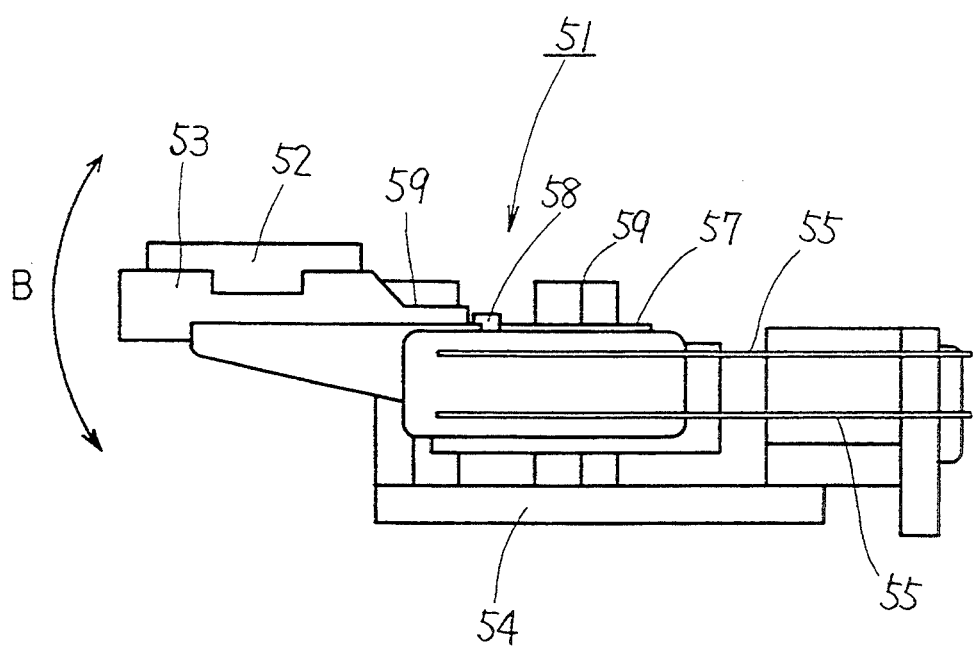
FIG. 6 is a side view of an objective lens driving apparatus showing a turn around an axis of the tracking direction.
Figure 7A:
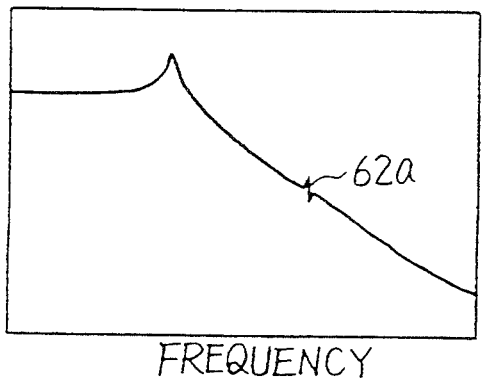
FIGS. 7A to 7D are graphs of transfer function in focusing and tracking directions of a conventional objective lens driving apparatus, respectively.
Figure 7B:
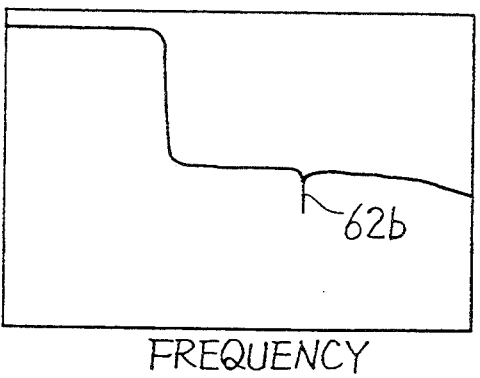
Figure 7C:
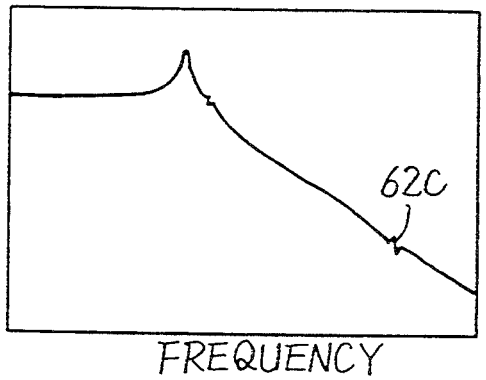
Figure 7D:
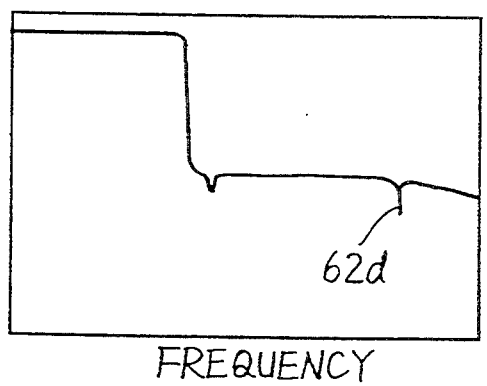

FIG. 1 is a perspective view of one embodiment of the present invention. The entire structure thereof is substantially similar to that of a conventional one in FIG. 4. Reference numerals in FIG. 1 correspond to reference numerals in FIG. 4, each obtained by subtracting 50.

In an objective lens driving apparatus 1, a lens holder 3 is provided to hold an objective lens 2, elastic bodies 5, 5 . . . which support lens holder 3 movably in two directions against fixed portion 4 are attached at upper and lower positions of the fixed portion at both sides of lens holder 3, and damper members 6, 6 . . . are adhered to the joint portion in the vicinity of fixed portion 4 of elastic bodies 5.

A focusing coil 7 and a tracking coil 8 are adhered to the center hole of lens holder 3. Parts of focusing coil 7 and tracking coil 8 are located in a magnetic gap 9a in a magnetic circuit 9 extended from fixed portion 4, and magnetic circuit 9 includes permanent magnets 10a, 10b and yoke portions 11a, 11b. Focusing coil 7 is coiled to enclose one of the permanent magnets 10a and yoke 11a, and a portion unnecessary to generate driving force is positioned outside magnetic gap 9a.

The elastic bodies 5, as shown in FIGS. 2A to 2D are different from the conventional art. These elastic bodies have a first linear portion 5a extending from the side of movable portion 5f and a second linear portion 5b extending from the side of fixed portion 5g on the same line, and that elastic bodies 5 have a shape with a bent portion 5c, which serves as a coupling portion, in an intermediate portion. Damper member 6 is adhered to bridge a gap between a branched arm portion 5d branching from the first linear portion 5a extending from the side of movable portion 5f and a fixed end portion 5e. Elastic body 5 is in the form of flat spring, and to one side or both sides thereof, damper member 6 is affixed. Damper member 6 may be formed of a rubber material. Alternatively it may be formed of an aluminum foil or the like with a material having a damper effect adhered thereto.

Deformation of the elastic body will be described referring to FIGS. 2A to 2D. Elastic body 5 has a plane shape such as shown in FIG. 2A when external force is not exerted: however when the movable portion is moved in the focusing direction, linear portions 5a and 5b are bent in the focusing direction, resulting in the difference in displacement between branched arm portion 5d and fixed end portion 5e as shown in FIG. 2B. On the other hand, when the movable portion is moved in tracking direction, linear portions 5a and 5b are bent in the tracking direction, resulting in the difference in displacement between branched arm portion 5d and fixed end portion 5e as shown in FIG. 2C. When the force is exerted in longitudinal direction of liner portions 5a and 5b, a bend, which appears when a torsional moment acts on a bent portion, appears in linear portions 5a and 5b, as shown in FIG. 2D, causing the difference in displacement between branched arm portion 5d and fixed end portion 5e, due to the fact that linear portions 5a and 5b are not on the same line. Such vibrations can be suppressed since damper member 6 is adhered to bridge the gap between branched arm portion 5d and fixed end portion 5e.

Examples of transfer function are shown in FIGS. 3A to 3D. Corresponding to FIGS. 7A to 7D, FIGS. 3A and 3B are graphs of gain-to-frequency and phase-to-frequency transfer function in the focusing direction, and FIGS. 3C and 3D are graphs of gain-to-frequency and phase-to-frequency transfer function in the tracking direction.

Figure 2E:
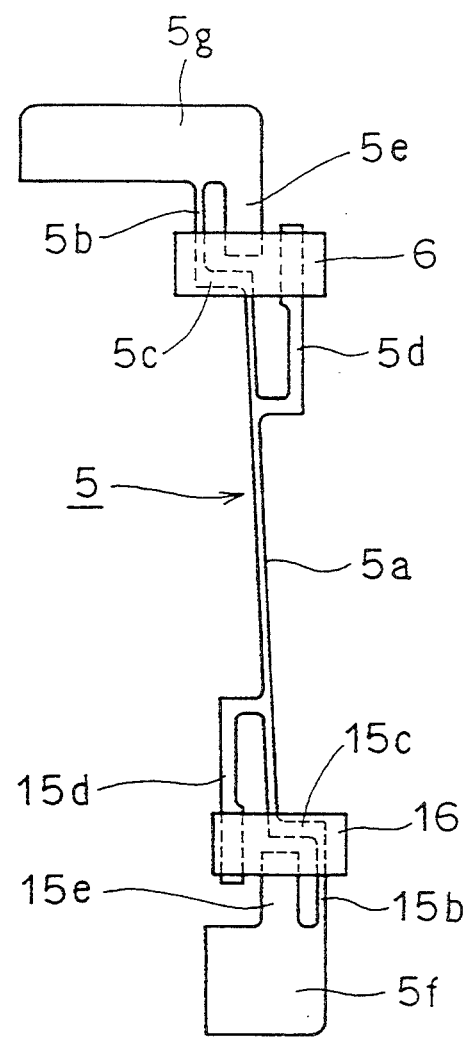
FIG. 2E is a diagram showing the shape of elastic body according to another embodiment.

In the above described embodiment, bent portion 5C and the like are provided near attaching portion at the side of fixed portion 5g. However, it should be noted that they are not limited to be at one side, and a third linear portion 15b which is not on the same line as linear portion 5a, a bent portion 15c, a branched arm portion 15d, a fixed end portion 15e and a damper member 16 may be provided near attaching portion 5f at the side of lens holder 3 as shown in FIG. 2E. Thus by these two bent portions 5c and 15c at both sides, further damping effect can be obtained.

Additionally, the bending direction of bent portions 5c and 15c, branched arm portions 5d and 15d or the like are not limited to the direction shown in the figures, and a variety of combinations may be possible, such as a pattern bent in the manner contrary in the lateral direction to those shown in FIGS. 2A–2E.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An objective lens driving apparatus, comprising:
   a fixed portion;
   a movable portion including condenser means for condensing a light beam to irradiate a recording medium therewith, and holding means for holding the condenser means;
   supporting means for supporting said movable portion against said fixed portion, so that said condenser means can be moved at least in focusing and tracking directions to said recording medium;

driving means for moving said movable portion in focusing and tracking directions; wherein said supporting means includes an elastic body for connecting said fixed portion and said movable portion, and a damping means provided for said elastic body;

said elastic body includes:

a first end portion attached to one of said movable portion and said fixed portion, a second end portion attached to the other of said movable portion and said fixed portion, and a connecting portion for connecting said first end portion and said second end portion;

said connecting portion includes a first linear portion, having flexibility, a second linear portion, having flexibility, extending along a different line from the first linear portion, a coupling portion extended in a direction crossing said first and second linear portions to couple these portions, and a branch portion with a free end branching from said first linear portion and extending away from said first end portion and toward said second end portion;

said first linear portion has two ends;

said second linear portion has two ends;

one end of said first linear portion is connected to said first end portion;

one end of said second linear portion is connected to said second end portion;

the other end of said first linear portion and the other end of said second linear portion are connected by said coupling portion; and said damping means connects said second end portion with said free end of said branch portion; and said branch portion being only a single branch portion extending only from a first side of the first linear portion and including a portion extending substantially in parallel with said first linear portion.

2. An objective lens driving apparatus, comprising:

a fixed portion;

a movable portion including condenser means for condensing a light beam to irradiate a recording medium therewith, and holding means for holding the condenser means;

supporting means for supporting said movable portion against said fixed portion, so that said condenser means can be moved at least in focusing and tracking directions to said recording medium;

driving means for moving said movable portion in focusing and tracking directions; wherein said supporting means includes an elastic body for connecting said fixed portion and said movable portion, and a damping means provided for said elastic body;

said elastic body includes:

a first end portion attached to one of said movable portion and said fixed portion, a second end portion attached to the other of said movable portion and said fixed portion, and a connecting portion for connecting said first end portion and said second end portion;

said connecting portion includes a first linear portion, having flexibility, a second linear portion, having flexibility, extending along a different line from the first linear portion, a coupling portion extended in a direction crossing said first and second linear portions to couple these portions, and a branch portion with a free end branching from said first linear portion and extending away from said first end portion and toward said second end portion;

said first linear portion has two ends;

said second linear portion has two ends;

one end of said first linear portion is connected to said first end portion;

one end of said second linear portion is connected to said second end portion;

the other end of said first linear portion and the other end of said second linear portion are connected by said coupling portion; and said damping means connects said second end portion with said free end of said branch portion;

said connecting portion is operatively connected with the second end portion and further includes another connecting portion operatively connected with the first end portion, said another connecting portion includes:

a third linear portion, having flexibility, extending along a different line from said first linear portion;

said second and third linear portions are located at opposite sides of said first linear portion, another coupling portion including a portion crossing said first and third linear portions;

another branch portion with a free end branching from said first linear portion and extending away from said second end portion and toward said first end portion;

and another damping means for connecting said first end portion with said free end of said another branch portion;

wherein said branching portion and said another branching portion branch are only single branch portions each single branch portion extending from opposite sides of said first linear portion.

* * * * *